US010445776B2

(12) United States Patent
Allen et al.

(10) Patent No.: US 10,445,776 B2
(45) Date of Patent: Oct. 15, 2019

(54) USER-CONFIGURABLE SETTINGS FOR WEB-BASED ADVERTISING

(71) Applicant: International Business Machines Corporation, Armonk, NY (US)

(72) Inventors: Tracy C. Allen, Oakland, CA (US); Charles J. Bryant, Binghamton, NY (US); Ajay K. Moluguru, Frisco, TX (US); Eileen P. Tedesco, Sharon, CT (US); Cherri M. Vidmar, Gilroy, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 665 days.

(21) Appl. No.: 14/937,160

(22) Filed: Nov. 10, 2015

(65) Prior Publication Data

US 2017/0132661 A1    May 11, 2017

(51) Int. Cl.
| | | |
|---|---|---|
| *G06Q 30/00* | (2012.01) | |
| *G06Q 30/02* | (2012.01) | |
| *H04L 29/08* | (2006.01) | |
| *H04L 29/06* | (2006.01) | |
| *H04W 4/23* | (2018.01) | |

(52) U.S. Cl.
CPC ..... *G06Q 30/0255* (2013.01); *G06Q 30/0269* (2013.01); *G06Q 30/0277* (2013.01); *H04L 67/02* (2013.01); *H04L 67/306* (2013.01); *H04L 67/42* (2013.01); *H04W 4/23* (2018.02)

(58) Field of Classification Search
USPC .............................. 705/14.41, 14.71, 14.73
See application file for complete search history.

(56) References Cited

U.S. PATENT DOCUMENTS

| | | | |
|---|---|---|---|
| 7,734,632 B2 | 6/2010 | Wang | |
| 2005/0050027 A1* | 3/2005 | Yeh | G06F 17/3087 |
| 2007/0078835 A1 | 4/2007 | Donnelli | |
| 2009/0063268 A1 | 3/2009 | Burgess et al. | |
| 2013/0138508 A1* | 5/2013 | Gee | H04W 4/21 |
| | | | 705/14.58 |
| 2014/0040010 A1* | 2/2014 | Garcia-Martinez | G06Q 30/02 |
| | | | 705/14.43 |

OTHER PUBLICATIONS

Tracy C. Allen, et al., "User-Configurable Settings for Web-Based Advertising," U.S. Appl. No. 15/070,105, filed Mar. 15, 2016.
List of IBM Patents or Patent Applications Treated as Related, (Appendix P), Filed: Mar. 16, 2016, 2 pages.

* cited by examiner

*Primary Examiner* — Sun M Li
(74) *Attorney, Agent, or Firm* — Cantor Colburn LLP; William Kinnaman

(57) ABSTRACT

An aspect of providing user-configurable settings for web-based advertising includes creating, via a computer processor, a data structure at a client browser. The data structure is created from user-inputted subjects of interest. An aspect also includes sending, during a session between the client browser and a server from a domain, information about an availability of the data structure; and receiving an advertisement from the server based on the subjects of interest in the data structure.

10 Claims, 3 Drawing Sheets

USER-CONFIGURABLE SETTINGS FOR WEB-BASED ADVERTISING

BACKGROUND

The invention relates generally to data processing, and more specifically, to user-configurable settings for web-based advertising.

Targeted web-based advertising typically employs some analysis of a user's browsing history to estimate what types of products and/or services the user may be interested in. For example, if the user searches various websites for digital cameras, it is assumed that the user may be interested in purchasing a digital camera. However, once the user has purchased the item, the user may no longer desire to see advertisements directed to that subject matter. In addition, sometimes the browsing history can be misleading in that the user may be searching for items to purchase as a gift, though the user has no personal interest in that item and does not desire to see continuous advertisements directed to that item once the gift has been purchased. In addition, oftentimes the interests of the user change over time. An item that was searched last week may not be of current interest to the user.

It is clear that a primary goal of advertisers is to engage as many users as possible in clicking on advertisements that are embedded in web pages served to the users' devices. In addition, most users are amenable to receiving advertisements embedded in web pages that are of interest to the users. The challenge for advertisers is understanding what items or services are of interest to a user at any given point in time.

SUMMARY

According to an embodiment a method, system, and computer program product for providing user-configurable settings for web-based advertising is provided. A method includes creating, via a computer processor, a data structure at a client browser. The data structure is created from user-inputted subjects of interest. The method also includes sending, during a session between the client browser and a server from a domain, information about an availability of the data structure, and receiving an advertisement from the server based on the subjects of interest in the data structure.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Exemplary embodiments provide user-configurable settings for web-based advertising. The user-configurable settings for web-based advertising provide accurate and timely information directed to items or subjects of interest to a user of a web-enabled computer device. The information may also include items or subjects to which the user may has no interest in. The information is input by the user via a web browser application, and a data structure is created to include this information. When the user first accesses a web server computer, information about the availability of the data structure is sent to the web server computer. The web server computer may then apply this information in selecting more particularized advertisements to send to the user, e.g., within a web page accessed by the user. The information relating to the dislikes may be used as constraints to remove certain advertisements from selection.

Figure 1:
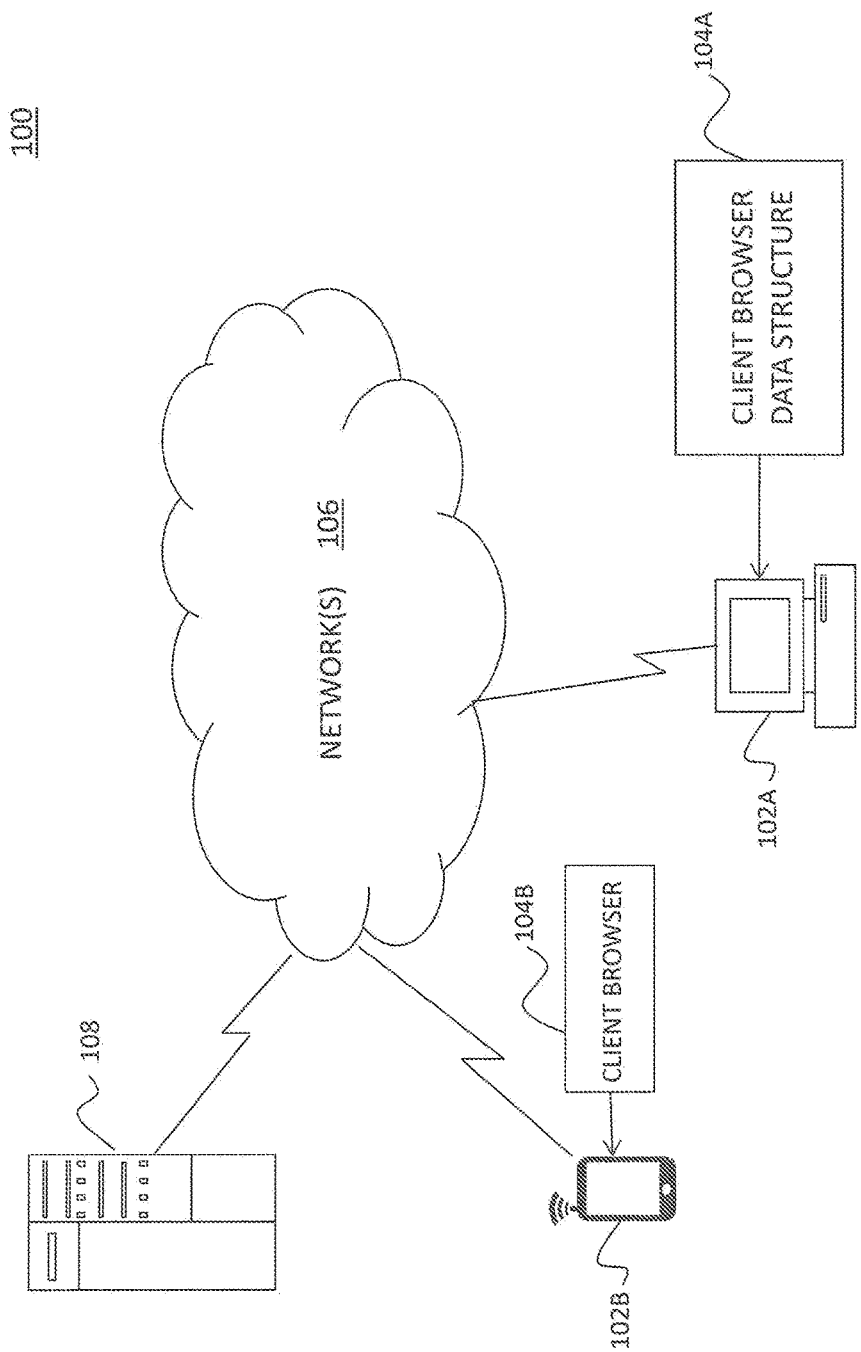
FIG. 1 depicts a system upon which user-configurable settings for web-based advertising may be implemented in accordance with an embodiment of the invention.

Turning now to FIG. 1, a system 100 upon which the user-configurable settings for web-based advertising may be implemented will now be described in an embodiment. The system 100 includes client devices 102A and 102B and a web server computer 108, each of which is communicatively coupled to one or more networks 106. The client devices 102A and 102B are collectively referred to as client devices 102.

The client device 102A may be general-purpose computer, e.g., a desktop, laptop, etc. The client device 102B may be a portable communications device, such as a smart phone, tablet, personal digital assistant, etc. Each of the client devices implements a web browser application for navigating network resources, such as one or more websites. In an embodiment, the client devices represent consumer devices owned and/or operated by a single individual or household. The client devices 102A and 102B store web browser applications in memory 104A and 104B, respectively. The web browser applications may be configured to implement the exemplary user-configurable settings for web-based advertising described herein. In one embodiment, the user-configurable settings for web-based advertising may be implemented as a plug-in to the web browser. When a user opens the web browser application, an option for creating, editing, and/or deleting preferences may be presented on a screen of the client device.

The client device 102A stores a data structure that is created via the user-configurable settings for web-based advertising described herein. The data structure contains information that reflects a user's interests in terms of products or services at a given point in time. For example, the user may be interested in purchasing a flat screen television within the next few weeks. In addition, the data structure may contain information that reflects a user's aversion to various products and/or services. For example, if the user is an animal activist, the user may have no interest in hunting gear. This information can be inputted by the user directly into a feature of the web browser application. The data structure is created at the web browser to include the user-inputted information. When the user accesses a web server computer, the information in the data structure is made available to the web server computer.

An illustrative example of a sample data structure is shown below:

```
active==n; interest {item1;item2} aversion {itemA}
active==n where n is (y,n)
each item list as: description:priority#:expiration date
``` each item is separated by ';' with priority & expiration being an optional example:

```
active==y;interest {diesel jeans women:1:20161231;digital
camera:1:20151231;
shoes women:2;tutoring math:3;jewelry};aversion{hunting}
```

The data structure may be deployed as a general cookie and/or subcookie and may be sent by a client device 102 along with other specific subcookies built from previous visits to web sites.

In one embodiment, the data structure may be embodied in a cookie. For example, when the client device 102 accesses the web server computer 108, the web server sends a data packet (cookie) to the client device 102. The data structure may include a tag to the cookie, such that when the client device 102 next accesses the web server computer 108, the cookie is transmitted to the web server computer 108 along with information in the data structure.

The web server computer 108 refers to a network resource that is accessible by the client devices 102. For example, the web server computer 108 may serve web pages associated with one or more websites. Many websites today incorporate advertising, either directed to products and/or services sold by a business associated with the website, or directed to products and/or services sold by third-party enterprises that purchase advertising space on the website. Thus, the web server computer 108 serves web pages that include various advertisements. The web server computer 108 may be implemented as a high-speed computer processing device for handling the volume of activities associated with client devices that access the web pages served by the computer 108.

Networks 106 may include a combination of one or more different types of networks (e.g., local area network, wide area network, Internet, satellite, or terrestrial network, to name a few).

Figure 3:
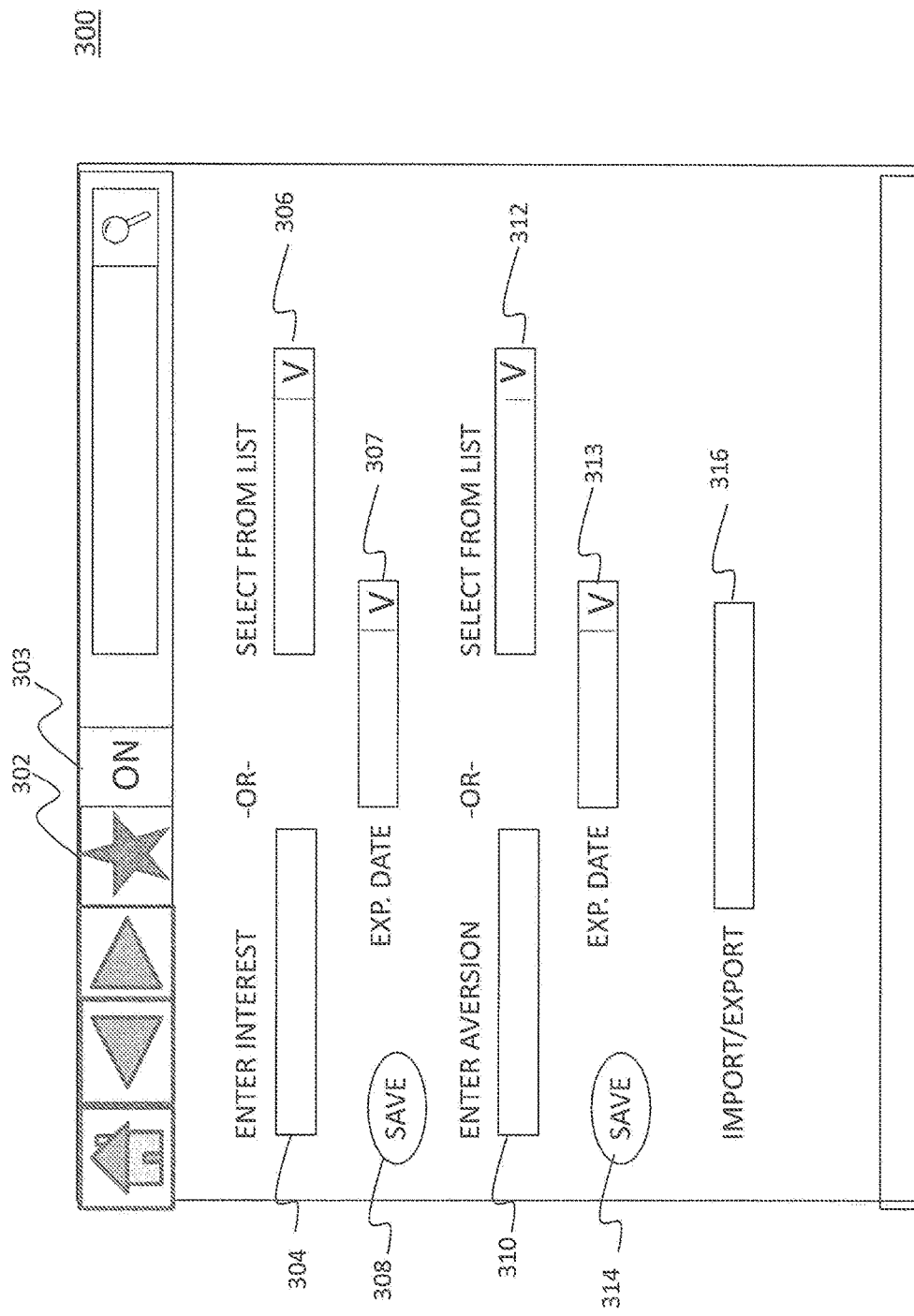
FIG. 3 depicts a user interface of a sample configuration screen according to an embodiment of the invention.

A process for implementing the user-configurable settings for web-based advertising will now be described in an embodiment. The process assumes that a user has opened the web browser application on the client device 102A. In an embodiment, the user may be prompted to activate the feature on the web browser application, e.g., through a popup window, or the user may select an option on the toolbar of the browser to initiate the process. Additionally, this feature may be made available via the OPTIONS or SETTINGS path of the web browser or plug-in. FIG. 3 illustrates user interface screen 300 including an option 302 on a toolbar of the browser application for creating, editing, and deleting information.

Once the user opens the web browser application and selects the option 302, the user interface screen 300 is displayed. The user is provided with a choice of directly entering interests in field 304, e.g., by entering free text, or may select from a listing of predefined items via field 306. A field 307 is provided in which the user may optionally enter an expiration date for each selected interest. The expiration date specifies a date when the user believes he/she will no longer desire advertisements relating to the corresponding interest. When the user enters an interest in field 304, the user may store the selection by selecting save option 308. The field 304 is then cleared and the user may enter another interest and corresponding expiration date in the respective fields 304 and 307 if desired. With respect to field 306, the user may be prompted to highlight multiple selections from the list. The subjects of interests can be specific products or services (e.g., flat screen television), brands (e.g., any product having a specified brand), ingredients of food items (e.g., any food item containing chocolate), and/or a combination of the above. In an embodiment, the option 302 enables the user to place a priority value on each of the subjects of interest (not shown). In this manner, a most desired (highest priority) item can be selected for presentation within a web page's advertisement before lower priority items.

As indicated above, the user may desire to provide subjects of advertising to which the user is averse. An example is a user who is an animal activist who may not want to receive any advertisements relating to hunting gear. In other embodiments, the subjects of aversion may be a brand name, a retail store, food items to which the user is allergic, and/or items that include ingredients disliked by the user. The user may enter these subjects via field 310, whereby the user selects save option 314 to save the entered subject, or the may select from a predefined list of subjects in field 312. Similar to the interests described above, a field 313 is provided in which the user may select an expiration date for the aversion entered through either of options 310 and 312.

Also shown in FIG. 3 is an option to import and/or export a data structure between client devices 102. The receiving client device 102 is an example of a domain for which the user can specify import and/or export of the data structure. For example, the user of client device 102A has input subjects of interest (and aversion) through the web browser application on client device 102A and would like to export the data structure to the user's other client device 102B. The user can implement this feature by selecting option 316. In another embodiment, a domain to which the user may specify export of the data structure may be a particular website. In an embodiment, the import/export functionality may be implemented by exporting the contents of the data structure to a file or importing the contents via a file. The user interface may include a browser option for specifying a location of import or export. The user may then share the file by sending it to an identifier, putting it on a shared file system, or a shared network drive. Another method of importing and exporting the data structure is via a cloud-based user account via, e.g., an option on a toolbar of the web browser.

Once the user has completed entering these settings, the user's web browser may provide an indicator 303 that the web-based advertising services are active. The user may selectively de-active the services through this indicator 303, which may be configured to toggle the service on and off by the user. In an embodiment, the contents of the data structure created through the user's settings may be displayed for the user via the interface screen (not shown). In this embodiment, the services may be configured to enable the user to add, edit, and remove items to the list of interests and aversions.

Figure 2:
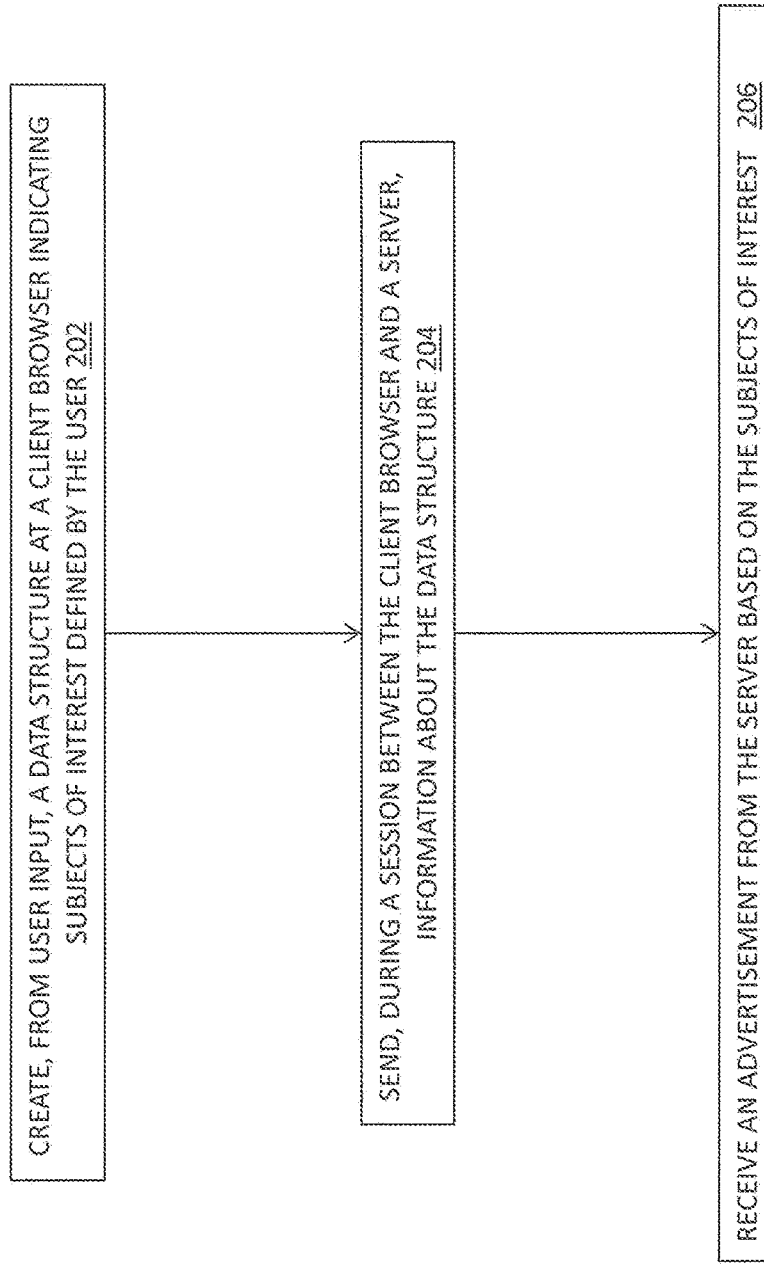
FIG. 2 depicts a flow diagram of a high-level process for implementing user-configurable settings for web-based advertising in accordance with an embodiment of the invention.

Once the information is input by the user, a process as described in FIG. 2 is performed in accordance with an embodiment. In block 202, the web browser application creates a data structure and stores this information in the data structure on the client device. The process of FIG. 2 assumes that the user accesses a particular website for the first time since creating the data structure.

In block 204, the browser application sends, during a session between the browser and a server from a domain (e.g., web server computer 108), information about the availability of the data structure. The web server computer 108 can use the information as a filter to determine which advertisements to send to the client computer and which advertisements to avoid sending to the client computer. In addition, web server computer may consult the priorities of the user's interests in selecting an advertisement. The web server computer 108 serves the web page requested by the user during the session along with an embedded advertisement that meets the criteria specified in the data structure.

In block 206, the client computer receives the advertisement from the server based on the subjects of interest in the data structure. In an embodiment, the user may edit, add, or delete these interests/aversions as desired. For example, suppose the user purchases the flat screen television and no longer desires advertisements containing sales of televisions. The user may delete this interest when the web browser application is next accessed by the user.

Technical effects and benefits include providing accurate and timely information directed to items or subjects of interest to a user of a web-enabled computer device. The information is input by the user via a web browser application, and a data structure is created to include this information. When the user first accesses a web server computer, information about the availability of the data structure is sent to the web server computer. The web server computer may then apply this information in selecting more particularized advertisements to send to the user, e.g., within a web page accessed by the user. The information relating to dislikes may be used as constraints to remove certain advertisements from selection.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory having computer readable instructions; and
   a processor for executing the computer readable instructions, the computer readable instructions including:
   creating a data structure at a client browser of the processor, the data structure created from a consumer inputting a subject of interest, a first expiration date associated with the subject of interest, a subject of aversion, and a second expiration date associated with the subject of aversion, wherein the subject of aversion reflects an aversion of the consumer to various products or services, and wherein the consumer associates a priority with the subject of interest;
   embedding the data structure in a cookie;
   sending, during a session between the client browser and a server from a domain, the cookie to the server, the cookie comprising information about an availability of the data structure;
   receiving an advertisement from the server, the advertisement being selected from a plurality of advertisements based at least in part on the cookie, the selection based on the subject of interest in the data structure, the first expiration date associated with the subject of interest, and the priority associated with the subject of interest, wherein the advertisement is devoid of goods or services corresponding to the subject of aversion prior to expiration of the second expiration date associated with the subject of aversion; and
   presenting a web page having the advertisement embedded therein, the advertisement being directed to the subject of interest and being devoid of goods or services corresponding to the subject of aversion.

2. The system of claim 1, wherein the subject of interest is one of a plurality of subjects of interest that include a consumer-prioritized listing of types of advertisements desired by the consumer.

3. The system of claim 1, wherein the computer readable instructions further comprise:
   providing, via an options component at the client browser, an interface including prompts for inputting the subject of interest and the subject of aversion;
   wherein the prompts further include a prompt to configure at least one domain to which the data structure is sent.

4. The system of claim 1, wherein the data structure indicates at least one domain to which the data structure is sent.

5. The system of claim 1, wherein the domain is a computer device associated with the consumer, and the data structure is stored in memory of the computer device.

6. The system of claim 1, wherein the data structure is updateable via the client browser based on subsequent inputs received from the consumer.

7. A computer program product comprising a computer readable storage medium having program instructions embodied therewith, wherein the computer readable storage medium is not a transitory signal per se, the program instructions executable by a computer processor to cause the computer processor to perform a method comprising:
   creating a data structure at a client browser, the data structure created from a consumer inputting a subject of interest, a first expiration date associated with the subject of interest, a subject of aversion, and a second expiration date associated with the subject of aversion, wherein the subject of aversion reflects an aversion of the consumer to various products or services;
   embedding the data structure in a cookie;
   the cookie to the server, the cookie comprising sending, during a session between the client browser and a server from a domain, the cookie to the server, the cookie comprising information about an availability of the data structure;
   receiving an advertisement from the server, the advertisement being selected from a plurality of advertisements based at least in part on the cookie, the selection based on the subjects subject of interest in the data structure, the first expiration date associated with the subject of interest, and the priority associated with the subject of interest, wherein the advertisement is devoid of goods or services corresponding to the subject of aversion prior to expiration of the second expiration date associated with the subject of aversion; and
   presenting a web page having the advertisement embedded therein, the advertisement being directed to the subject of interest and being devoid of goods or services corresponding to the subject of aversion.

8. The computer program product of claim 7, wherein the subject of interest is one of a plurality of subjects of interest that include a consumer-prioritized listing of types of advertisements desired by a consumer.

9. The computer program product of claim 7, wherein the program instructions are further executable to perform:

providing, via an options component at the client browser, an interface including prompts for inputting the subjects subject of interest and the subject of aversion;
wherein the prompts further include a prompt to configure at least one domain to which the data structure is sent.

10. The computer program product of claim 7, wherein the domain is a computer device associated with the consumer, and the data structure is stored in memory of the computer device.

\* \* \* \* \*